A. BIRNBAUM.
WHEEL TIRE.
APPLICATION FILED JAN. 30, 1909.
925,985.  Patented June 22, 1909.
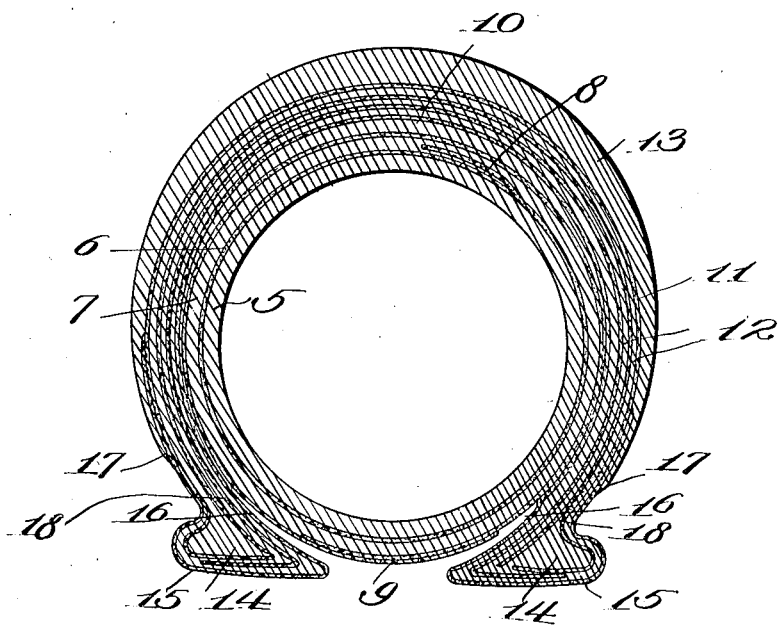
Witnesses:
Inventor
Anton Birnbaum
By
James L. Norris.
Atty.

UNITED STATES PATENT OFFICE.

ANTON BIRNBAUM, OF ERIE, PENNSYLVANIA.

WHEEL-TIRE.

No. 925,985.  Specification of Letters Patent.  Patented June 22, 1909.

Application filed January 30, 1909. Serial No. 475,128.

*To all whom it may concern:*

Be it known that I, ANTON BIRNBAUM, a citizen of the United States, residing at Erie, in the county of Erie and State of Pennsylvania, have invented new and useful Improvements in Wheel-Tires, of which the following is a specification.

This invention relates to wheel tires of the pneumatic type, and the primary object of the same is to provide a device of this class having a reliable protection for the inner tube and the outer tube or clencher, to prevent, to a material extent, bursting of the inner tube and disadvantages arising from puncture of the outer and inner tube; and to so strengthen the surrounding wall of the inner tube as to cause it to withstand a maximum pressure due to inflation and extra strain imposed thereon by expansion of the air within the said inner tube.

A further object of the invention is to provide a tire having such reinforced construction that in the event of break-down from puncture or other causes the tire will have sufficient body to permit running of the wheel on which it is applied without liability of cutting through the tire and until a repair shop or repair implements are accessible.

A still further object of the invention is to provide a tire having attaching edges which are free or loose in relation to the remaining part of the tire for ready application to and removal from the side flanges of the wheel rim.

With these and other objects and advantages in view, the invention consists in the construction and arrangement of the several parts which will be more fully hereinafter described.

The accompanying drawing illustrates a cross-sectional view of a tire embodying the features of the invention and showing one practical application of the particular advantageous structure which will be hereinafter more fully explained.

The numeral 5 designates an inner tube similar to that now in use and adapted to be inflated to serve as a cushioning means and maintain the complete tire in practical distended condition. Applied completely around this inner tube is a winding of protective material, as at 6, said material being preferably textile fabric, such as canvas. Between the convolutions of this winding of protective material are layers 7 of rubber or rubber compound, the rubber being preferably wound with the textile fabric in soft or adhesive condition. The ends of the protective winding, as at 8 and 9, are overlapped and the complete covering for the inner tube as just described is thicker at the outer portion thereof or adjacent the tread part of the complete tire, as at 10, to increase the resistance to penetration of said part of the covering and thus afford a greater protection at this point for the inner tube. The inner tube and its protective covering will be subjected to a suitable vulcanizing treatment to set up a positive association of the inner tube and its covering or to render the said parts practically homogeneous. For light running motor vehicles the inner tube with the protective covering as explained may be used without other inclosure or tread means, but it is preferred for all practical purposes that the inner tube and covering be inclosed within an outer tire or clencher structure. This outer tire or clencher structure consists of a folded protective medium 11 having the folds thereof superposed, and between the several folds are layers 12 of rubber or rubber compound which is applied with the protective medium similarly to the layers of rubber or rubber compound applied with the winding 6 over the inner tube 5, as hereinbefore explained. Over the outermost fold 11 a crescent-shaped exterior layer 13 of rubber or rubber compound is applied, the thickest part of this latter layer being located at the tread portion of the tire. This outer tire or clencher organization as a whole is applied over and secured to the inner tube 5 and its protective covering embodying the winding 6 of textile material and layers 7 of rubber or rubber compound, and an adhesion is set up between the outer tire or clencher and the protective covering for the inner tube by suitable means and preferably through the medium of a vulcanizing treatment. The protective medium 11 of the outer tire or clencher organization is preferably a textile fabric, such as canvas and is extended downwardly into the side edges of the outer tire or clencher, the latter having the usual contour in cross-section, as at 14, and composed in the present instance of both a protective or strengthening medium and rubber or rubber compound, the outer covering for the said side edges or attaching terminals of the outer tire being a textile fabric, as at 15, continued from the fabric 11.

These attaching edges or terminals of the outer tire or clencher have their inner portions disconnected, as at 16, with relation to the adjacent protective covering of the inner tube so that said attaching edges or terminals of the outer tire are free for inward and outward movement, or the outer tire at this point is loose to facilitate application and removal of the side edges or attaching terminals of the complete tire with relation to the side flanges or other receptive means carried by or forming a part of the wheel rim to which the tire is fitted. To facilitate and permit unretarded movement of the attaching edges or terminals of the complete tire, the outer layer 13 has its lower reduced extremities terminating, as at 17, at a distance above the said edges or terminals for attaching the tire, and by this means a flexible neck 18 is formed for each attaching edge or terminal of the tire with obvious advantages in fitting the two edges or terminals into or removing them from the receptive means forming part of the wheel rim.

Aside from the full protection of the tire including both the inner tube and the outer tire or clencher, the loose attaching side edges or terminals of the complete tire present an important advantage particularly in view of a certain amount of relaxation given to the opposite side portions of the tire at its points of attachment to the wheel rim, said loose attaching side edges or terminals reducing the liability of cracking or fracturing the said side portions of the tire after prolonged usage and which might otherwise ensue or be present if the side edges or attaching terminals of the tire were fixed as in ordinary tire structures. This advantage, in addition to the interposition of the protective medium as explained, results in the production of a wheel tire of a strong and durable nature and one capable of sustaining the weight of a vehicle in the event of a puncture and the absence of immediate means of repair and until a place of repair is reached. The tire by reason of the loose attaching side edges or terminals can also be more quickly and easily applied to and detached from a wheel rim.

What is claimed is:

1. A wheel tire comprising an inner tube enveloped by a protective covering, an outer tire portion applied over and secured to the protective covering and having a protective medium therein, and loose attaching terminals having spaces between the same and the adjacent portions of the protective covering of the inner tube.

2. A wheel tire comprising an inner tube enveloped by a protective covering secured thereto, and an outer tire portion having folds of protective material embedded therein and provided with loose attaching terminals in which the protective material is extended, the outer tire portion being fitted over and secured to the protective covering of the inner tube.

In testimony whereof I have hereunto set my hand in the presence of two subscribing witnesses.

ANTON BIRNBAUM.

Witnesses:
ELIZABETH M. SCHMITZ,
CHARLES A. MERTENS.